Aug. 6, 1963 L. J. JASTER 3,099,888
ICE FISHING NET
Filed June 21, 1962
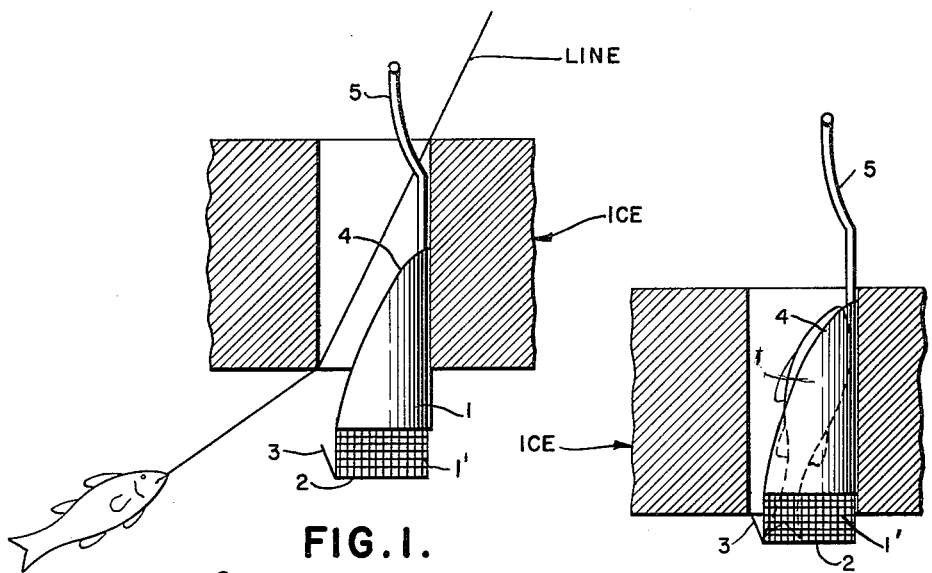
FIG.1.
FIG.2.
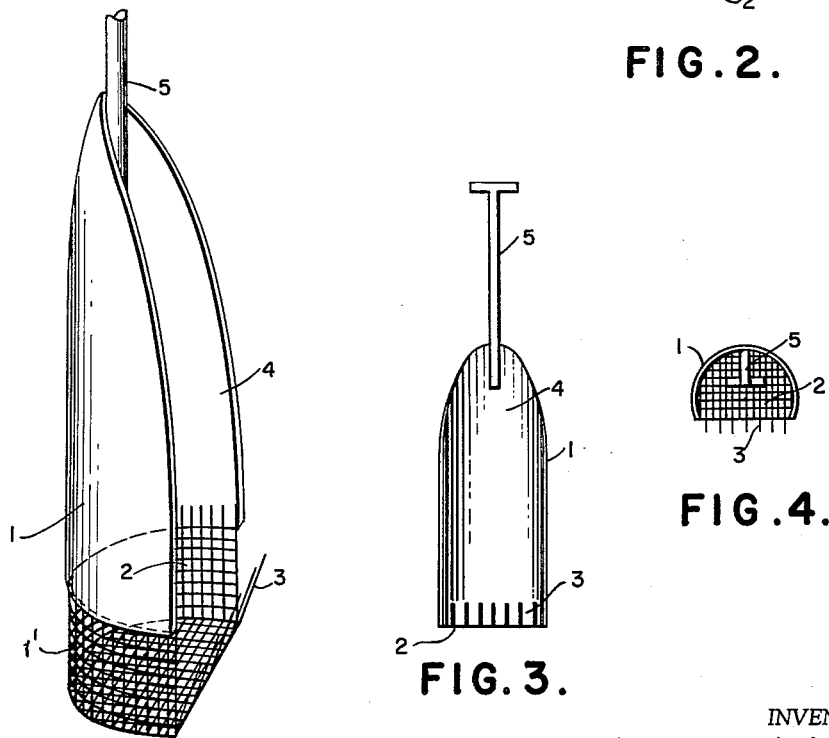
FIG.5.
FIG.3.
FIG.4.
INVENTOR
Lawrence J. Jaster
George M. Anderson.
BY
ATTORNEY

United States Patent Office 3,099,888
Patented Aug. 6, 1963

3,099,888
ICE FISHING NET
Lawrence J. Jaster, 702 N. 2nd St., Bellevue, Iowa
Filed June 21, 1962, Ser. No. 204,187
3 Claims. (Cl. 43—11)

The invention relates to fishing nets, an object being to provide a fishing net adapted for use in fishing through holes cut or chopped in ice of fourteen inch thickness and seven inches more or less across, wherein there is no room for dipping the net under a fish on the line as customary.

The invention resides in the novel construction and combination of parts hereinafter set forth in the claims.

In the accompanying drawings:

FIGURE 1 is a side view of the invention in first position in netting a fish, the ice and the hole therein being shown;

FIGURE 2 is a view similar to FIG. 1 showing the invention in second position in netting a fish;

FIGURE 3 is a front view of the invention; showing a modification.

FIGURE 4 is a top plan view thereof; and

FIGURE 5 is a perspective view of the invention with the handle rod partly broken away.

In the drawings the numeral 1 designates the ice fishing net comprising an elongated vertically positioned impervious hollow body 1, having a uniformly curved cross-section to define a substantially semi-cylindrical base portion, said body being open throughout its length on one side and tapering upwardly at 4 to define an apex, and a screen bottom 2 secured to said base portion having means comprising an upstanding toothed front edge 3 disposed at the open end of said body to retain a fish in the net as the net is withdrawn from said hole.

Said body is provided with a handle rod 5, said rod being vertically elongated with the net and secured thereto at the apex of said body and bowed outwardly and upwardly therefrom.

In operation when a fish on the line has been drawn up near the hole in the ice the net is lowered through and partly below the hole as in FIG. 1, whereupon the fish and net together with the fish in the net are drawn up into the hole, as in FIG. 2, after which the fish is landed on the ice. The ice then closing the open side of the net and the sharp points or teeth 3 acting as a safeguard against loss of the fish.

In this way the fish may be landed on the ice without danger of the fish wriggling off the hook before it can be landed.

The hole chopped or cut in the ice is usually no larger than necessary and is usually about seven inches more or less in diameter, the ice being frequently twelve or fourteen inches in thickness more or less, so that the fish may readily be lost by wriggling off the hook or being caught by the ice, against drag on the line, or the line cut by the sharp edges of the ice.

The right is reserved to modifications within the scope of the claims.

A ¼ inch mesh screen 1' may be used at the lower portion of said body to permit water to flow through the net when there is a current.

In FIGURE 3 this screen is omitted.

I claim:

1. An ice fishing net for fishing through a hole in the ice, comprising an elongated vertically positioned impervious hollow body, having a uniformly curved cross-section to define a substantially semi-cylindrical base portion, said body being open throughout its length on one side and tapering upwardly to define an apex, and a screen bottom secured to said base portion and having upwardly disposed means disposed at the open side of said body to retain a fish in the net as the net is withdrawn from said hole.

2. An ice fishing net as defined in claim 1, in which said means comprises an upstanding toothed front edge.

3. An ice fishing net as defined in claim 2, in which said net is provided with a handle rod, said rod being vertically elongated with the net and secured thereto at the apex of said body and bowed outwardly and upwardly therefrom.

References Cited in the file of this patent

UNITED STATES PATENTS

| 1,444,713 | Taylor | Feb. 6, 1923 |
| 1,582,293 | Miller | Apr. 27, 1926 |
| 2,546,113 | Spang | Mar. 20, 1951 |
| 2,604,715 | Brown | July 29, 1952 |
| 2,604,723 | Bennett | July 29, 1952 |
| 2,666,662 | McLeod | Jan. 19, 1954 |

FOREIGN PATENTS

| 131,758 | Great Britain | Sept. 4, 1919 |